(12) United States Patent
Patil et al.

(10) Patent No.: US 9,989,169 B2
(45) Date of Patent: *Jun. 5, 2018

(54) CONDUIT CLAMP FOR STRUT CHANNEL

(71) Applicant: COOPER TECHNOLOGIES COMPANY, Houston, TX (US)

(72) Inventors: Sagar Ashok Patil, Pune (IN); Zhihui Zhang, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/398,474

(22) Filed: Jan. 4, 2017

(65) Prior Publication Data

US 2017/0198834 A1    Jul. 13, 2017

Related U.S. Application Data

(63) Continuation of application No. 14/702,145, filed on May 1, 2015, now Pat. No. 9,546,744.

(30) Foreign Application Priority Data

May 2, 2014    (IN) .......................... 1197/DEL/2014

(51) Int. Cl.
*F16L 3/10*    (2006.01)
*F16L 3/227*    (2006.01)
*F16L 3/24*    (2006.01)

(52) U.S. Cl.
CPC .............. *F16L 3/10* (2013.01); *F16L 3/1066* (2013.01); *F16L 3/1083* (2013.01); *F16L 3/227* (2013.01); *F16L 3/24* (2013.01); *Y10T 29/49961* (2015.01)

(58) Field of Classification Search
CPC ... F16L 3/24; F16L 3/10; F16L 3/1083; F16L 3/1066; F16L 3/22; F16L 13/1033; F16L 3/227; F16L 3/221; F16L 3/04; F16B 37/045
USPC ............ 24/74.1, 62, 58, 73, 316.1, 68.1, 63, 24/747.4, 228.1, 230, 298.1
See application file for complete search history.

(56) References Cited

U.S. PATENT DOCUMENTS

| | | | |
|---|---|---|---|
| 1,319,652 | A | 10/1919 | Korns |
| 1,813,545 | A | 7/1931 | Reinhold |
| 1,934,760 | A | 11/1933 | Awbrey |
| 1,963,908 | A | 6/1934 | Manasek |
| 2,307,653 | A | 1/1943 | Wright |

(Continued)

FOREIGN PATENT DOCUMENTS

| | | |
|---|---|---|
| CN | 202416847 U | 9/2012 |
| DE | 7701100 | 5/1977 |

(Continued)

OTHER PUBLICATIONS

Drawing of MQM Wing Nut, (at least as early as Mar. 13, 2012), 1 page.

(Continued)

*Primary Examiner* — Adriana Figueroa
*Assistant Examiner* — Jessie T Fonseca
(74) *Attorney, Agent, or Firm* — Senniger Powers LLP

(57) ABSTRACT

A conduit clamp includes a first coupling component configured for attachment to a first attachment structure of a strut channel and a second coupling component different from the first coupling component and configured for attachment to a second attachment structure of a strut channel.

11 Claims, 18 Drawing Sheets

(56) References Cited

U.S. PATENT DOCUMENTS

| | | |
|---|---|---|
| 2,375,513 A | 5/1945 | Bach |
| 2,420,826 A | 5/1947 | Irrgang |
| 2,470,991 A | 5/1949 | Kindorf et al. |
| 2,567,463 A | 9/1951 | Atkinson |
| 2,676,680 A | 4/1954 | Kindorf |
| 2,767,609 A | 10/1956 | Cousino |
| 2,767,951 A | 10/1956 | Cousino |
| 2,804,180 A | 8/1957 | Richardson |
| 2,846,169 A | 8/1958 | Sullivan |
| 2,944,642 A | 7/1960 | Evans |
| 3,005,292 A | 10/1961 | Reiland |
| 3,226,069 A | 12/1965 | Clarke |
| 3,266,761 A | 4/1966 | Walton et al. |
| 3,310,264 A | 3/1967 | Appleton |
| 3,312,034 A | 4/1967 | Steinmann |
| 3,396,499 A | 8/1968 | Biffani |
| 3,417,951 A | 12/1968 | Rebentisch, Jr. |
| 3,451,183 A | 6/1969 | Lespagnol et al. |
| 3,463,428 A | 8/1969 | Kindorf et al. |
| 3,486,726 A | 12/1969 | Kindorf et al. |
| 3,513,606 A | 5/1970 | Jones |
| 3,527,432 A | 9/1970 | Lytle |
| 3,547,385 A | 12/1970 | Kindorf et al. |
| 3,566,561 A | 3/1971 | Tozer |
| 3,592,493 A | 7/1971 | Goose |
| 3,601,347 A | 8/1971 | Attwood et al. |
| 3,612,461 A | 10/1971 | Brown |
| 3,650,499 A | 3/1972 | Biggane |
| 3,748,808 A | 7/1973 | Shepard et al. |
| 3,752,198 A | 8/1973 | Fiorentino et al. |
| 3,757,485 A | 9/1973 | Vincens |
| 3,836,936 A | 9/1974 | Clement |
| 3,863,300 A | 2/1975 | Becker |
| 3,944,308 A | 3/1976 | Persson |
| 3,986,314 A | 10/1976 | Moeller |
| 3,998,419 A | 12/1976 | Semmerling |
| 4,044,428 A | 8/1977 | Kowalski |
| 4,185,802 A | 1/1980 | Myles et al. |
| 4,211,381 A | 7/1980 | Heard |
| 4,216,930 A | 8/1980 | Rossler, Jr. et al. |
| 4,227,355 A | 10/1980 | Wendt |
| 4,358,216 A | 11/1982 | Pleickhardt et al. |
| 4,379,651 A | 4/1983 | Nagashima |
| 4,397,437 A | 8/1983 | Madej |
| 4,417,711 A | 11/1983 | Madej |
| 4,479,341 A | 10/1984 | Schuplin |
| 4,490,064 A | 12/1984 | Ducharme |
| 4,506,418 A | 3/1985 | Viola et al. |
| 4,516,296 A | 5/1985 | Sherman |
| 4,556,148 A | 12/1985 | Koller |
| 4,610,562 A | 9/1986 | Dunn |
| 4,637,748 A | 1/1987 | Beavers |
| 4,652,170 A | 3/1987 | Lew |
| 4,657,458 A | 4/1987 | Woller et al. |
| 4,666,355 A | 5/1987 | Stover |
| 4,708,554 A | 11/1987 | Howard |
| 4,726,165 A | 2/1988 | Brinsa |
| 4,729,532 A | 3/1988 | Moss |
| 4,784,552 A | 11/1988 | Rebentisch |
| 4,830,531 A | 5/1989 | Condit et al. |
| 4,895,412 A | 1/1990 | Deley et al. |
| 4,934,886 A | 6/1990 | Aikens |
| 4,948,313 A | 8/1990 | Zankovich |
| 4,950,099 A | 8/1990 | Roellin |
| 4,961,553 A | 10/1990 | Todd |
| 4,962,914 A | 10/1990 | Taylor |
| 4,993,670 A | 2/1991 | Tesar |
| 5,003,741 A | 4/1991 | Yeh |
| 5,014,940 A | 5/1991 | Sherman |
| 5,022,614 A | 6/1991 | Rinderer |
| D322,929 S | 1/1992 | Abbestam et al. |
| 5,078,537 A | 1/1992 | Nomura |
| 5,102,074 A | 4/1992 | Okada |
| 5,116,161 A | 5/1992 | Faisst |
| 5,118,233 A | 6/1992 | Mitchell |
| 5,127,758 A | 7/1992 | Kreusel |
| 5,141,186 A | 8/1992 | Cusic |
| 5,146,724 A | 9/1992 | Angelo |
| 5,163,644 A | 11/1992 | Kowalski |
| 5,175,971 A | 1/1993 | McCombs |
| 5,205,022 A | 4/1993 | Norton |
| 5,215,281 A | 6/1993 | Sherman |
| 5,228,263 A | 7/1993 | Vaughn |
| 5,271,586 A | 12/1993 | Schmidt |
| 5,274,888 A | 1/1994 | Payne |
| 5,292,013 A | 3/1994 | Earl |
| 5,335,890 A | 8/1994 | Pryor et al. |
| 5,351,926 A | 10/1994 | Moses |
| 5,356,234 A | 10/1994 | Vangool |
| 5,375,798 A | 12/1994 | Hungerford, Jr. |
| 5,489,173 A | 2/1996 | Hofle |
| 5,503,511 A | 4/1996 | Flamme |
| 5,531,539 A | 7/1996 | Crawford |
| 5,566,916 A | 10/1996 | Bailey |
| 5,595,363 A | 1/1997 | De Leebeeck |
| 5,628,508 A | 5/1997 | Koole |
| 5,628,598 A | 5/1997 | Höfle |
| 5,655,816 A | 8/1997 | Magnuson et al. |
| 5,655,865 A | 8/1997 | Plank et al. |
| 5,718,403 A | 2/1998 | Ott et al. |
| 5,729,948 A | 3/1998 | Levy et al. |
| 5,746,535 A | 5/1998 | Kohler |
| 5,779,412 A | 7/1998 | Nagai et al. |
| 5,799,452 A | 9/1998 | Moore |
| 5,799,907 A | 9/1998 | Andronica |
| 5,806,268 A | 9/1998 | Koller |
| 5,806,897 A | 9/1998 | Nagai et al. |
| 5,820,322 A | 10/1998 | Hermann et al. |
| 5,833,417 A | 11/1998 | Sargent et al. |
| 5,855,342 A | 1/1999 | Hawkins et al. |
| 5,864,997 A | 2/1999 | Kelly |
| 5,915,803 A | 6/1999 | Daugherty et al. |
| 5,918,999 A | 7/1999 | Lamarca |
| 5,924,650 A | 7/1999 | Richichi |
| 5,927,041 A | 7/1999 | Sedlmeier et al. |
| 5,934,818 A | 8/1999 | Schmitt et al. |
| 5,970,679 A | 10/1999 | Amore |
| 5,984,243 A | 11/1999 | Pfaller et al. |
| 5,988,930 A | 11/1999 | Liebetrau et al. |
| D421,655 S | 3/2000 | Daugherty et al. |
| 6,061,984 A | 5/2000 | Rose |
| 6,062,764 A | 5/2000 | Rixen et al. |
| 6,106,189 A | 8/2000 | Seale |
| 6,195,953 B1 | 3/2001 | Gitter et al. |
| 6,322,030 B1 | 11/2001 | Marra |
| 6,347,904 B1 | 2/2002 | Knighton |
| 6,454,232 B1 | 9/2002 | Roth |
| 6,484,358 B1 | 11/2002 | Duong et al. |
| 6,494,415 B1 | 12/2002 | Roth |
| 6,554,235 B1 | 4/2003 | Fortier |
| 6,561,473 B1 | 5/2003 | Ianello |
| 6,572,057 B1 | 6/2003 | Roth |
| 6,588,713 B2 | 7/2003 | Kilkenny |
| 6,655,099 B1 | 12/2003 | Trenoweth |
| 6,660,938 B2 | 12/2003 | Herb et al. |
| 6,679,461 B1 | 1/2004 | Hawkins |
| 6,682,253 B2 | 1/2004 | Binna et al. |
| 6,712,543 B1 | 3/2004 | Schmalzhofer |
| 6,726,117 B2 | 4/2004 | Herb et al. |
| 6,751,914 B2 | 6/2004 | Zeh et al. |
| 6,766,992 B1 | 7/2004 | Parker |
| 6,802,171 B2 | 10/2004 | McKinnon |
| 6,899,511 B2 | 5/2005 | Gurevich et al. |
| 6,991,198 B1 | 1/2006 | Roth |
| 7,014,213 B1 | 3/2006 | Kaiser |
| 7,044,701 B2 | 5/2006 | Herb |
| 7,070,374 B2 | 7/2006 | Womack et al. |
| 7,096,641 B2 | 8/2006 | Birnbaum et al. |
| 7,165,361 B2 | 1/2007 | Vanagan |
| 7,179,010 B2 | 2/2007 | Weger et al. |
| 7,240,884 B2 | 7/2007 | Shim |
| 7,287,733 B2 | 10/2007 | Bongio et al. |
| 7,389,621 B2 | 6/2008 | Hawes |
| 7,448,822 B2 | 11/2008 | Nebeker et al. |

(56) References Cited

U.S. PATENT DOCUMENTS

| | | |
|---|---|---|
| 7,478,787 B2 | 1/2009 | Bankston et al. |
| 7,484,697 B1 | 2/2009 | Nelson |
| 7,600,724 B2 | 10/2009 | Nelson et al. |
| 7,604,444 B2 | 10/2009 | Wu |
| 7,661,915 B2 | 2/2010 | Whipple |
| 7,818,925 B2 | 10/2010 | Benedict |
| 7,922,130 B2 | 4/2011 | Hawkins |
| 7,922,417 B2 | 4/2011 | Jimenez |
| 7,934,896 B2 | 5/2011 | Schnier |
| 7,984,601 B2 | 7/2011 | Birnbaum et al. |
| 3,020,328 A1 | 9/2011 | Lavi et al. |
| 8,100,600 B2 | 1/2012 | Blum |
| D654,064 S | 2/2012 | Sergi |
| 8,225,581 B2 | 7/2012 | Strickland et al. |
| 8,277,158 B2 | 10/2012 | Csik et al. |
| 8,303,223 B2 | 11/2012 | Rass et al. |
| 8,341,913 B2 | 1/2013 | Meres et al. |
| 8,366,340 B2 | 2/2013 | Munakata et al. |
| 8,454,259 B2 | 6/2013 | Oetlinger |
| 8,465,242 B2 | 6/2013 | Arendt et al. |
| 8,511,929 B2 | 8/2013 | Raye et al. |
| 8,523,923 B2 | 9/2013 | Thomke et al. |
| 8,567,030 B2 | 10/2013 | Koch et al. |
| 8,596,009 B2 | 12/2013 | Baxter et al. |
| 8,661,765 B2 | 3/2014 | Schaefer et al. |
| 8,662,455 B2 | 3/2014 | Hernandez et al. |
| 8,695,296 B2 | 4/2014 | Bergman |
| D728,753 S | 5/2015 | Hikoyama |
| 9,187,898 B1 | 11/2015 | Underkofler et al. |
| 9,194,418 B2 | 11/2015 | Parthibhan et al. |
| 9,249,994 B2 | 2/2016 | Zuritis |
| 9,651,171 B2 | 5/2017 | Zhang et al. |
| 9,746,105 B2 | 8/2017 | Zhang et al. |
| 2002/0000498 A1 | 1/2002 | Workman |
| 2002/0060280 A1 | 5/2002 | Yaphe et al. |
| 2002/0110435 A1 | 8/2002 | Herb et al. |
| 2002/0122691 A1 | 9/2002 | Wood |
| 2003/0042033 A1 | 3/2003 | Herb et al. |
| 2003/0043033 A1 | 3/2003 | Lee |
| 2003/0063961 A1 | 4/2003 | Lay |
| 2003/0122044 A1 | 7/2003 | Unverzagt et al. |
| 2003/0159397 A1 | 8/2003 | Birnbaum |
| 2003/0185643 A1 | 10/2003 | Thompson |
| 2004/0165943 A1 | 8/2004 | Herb |
| 2004/0165947 A1 | 8/2004 | Herb |
| 2004/0165965 A1 | 8/2004 | Unverzagt et al. |
| 2004/0228681 A1 | 11/2004 | Herb |
| 2005/0116123 A1 | 6/2005 | Bailey et al. |
| 2005/0129458 A1 | 6/2005 | Hoffmann |
| 2006/0027715 A1 | 2/2006 | Dinh et al. |
| 2006/0038398 A1 | 2/2006 | Whipple et al. |
| 2007/0040075 A1 | 2/2007 | Moretto |
| 2007/0075213 A1 | 4/2007 | Foser et al. |
| 2007/0101670 A1 | 5/2007 | Ahren et al. |
| 2007/0120036 A1 | 5/2007 | Olle et al. |
| 2007/0145222 A1 | 6/2007 | Rausch |
| 2007/0248793 A1 | 10/2007 | Herb et al. |
| 2008/0217490 A1 | 9/2008 | Bucciferro et al. |
| 2008/0229699 A1 | 9/2008 | Nehls |
| 2010/0102011 A1 | 4/2010 | Blum |
| 2010/0193645 A1 | 8/2010 | Merhar et al. |
| 2012/0110788 A1 | 5/2012 | Chen |
| 2012/0119037 A1 | 5/2012 | Azuma et al. |
| 2012/0286110 A1 | 11/2012 | Hill |
| 2012/0297723 A1 | 11/2012 | Siddiqui et al. |
| 2012/0315106 A1 | 12/2012 | Amedt et al. |
| 2013/0047541 A1 | 2/2013 | Mayer |
| 2014/0042286 A1 | 2/2014 | Jaffari |
| 2014/0091050 A1 | 4/2014 | Zhang |
| 2014/0093307 A1 | 4/2014 | Zhang |
| 2014/0097304 A1 | 4/2014 | Mastro |
| 2014/0197284 A1 | 7/2014 | Hikoyama |
| 2014/0260083 A1 | 9/2014 | Zhang et al. |
| 2014/0283475 A1 | 9/2014 | Zhang et al. |
| 2015/0176631 A1 | 6/2015 | McCarthy et al. |
| 2015/0276092 A1 | 10/2015 | Oliver et al. |
| 2015/0316178 A1 | 11/2015 | Patil et al. |
| 2015/0316203 A1 | 11/2015 | Zhang et al. |
| 2015/0322669 A1 | 11/2015 | Shih |
| 2016/0138633 A1 | 5/2016 | Zhang et al. |

FOREIGN PATENT DOCUMENTS

| | | |
|---|---|---|
| DE | 8232700 | 6/1983 |
| DE | 3513382 A1 | 10/1986 |
| DE | 8704502 | 7/1987 |
| DE | 102006035405 A1 | 5/2008 |
| DE | 202010004406 U1 | 8/2010 |
| DE | 102009000603 A1 | 9/2010 |
| DE | 20 2012 102 394 U1 | 9/2012 |
| EP | 0 592 743 A1 | 10/1992 |
| EP | 2 838 170 B1 | 3/2016 |
| GB | 569377 | 5/1945 |
| GB | 687403 | 2/1953 |
| GB | 1157545 | 7/1969 |
| GB | 1370645 | 10/1974 |
| JP | 2000-139583 A | 5/2000 |
| WO | 9837349 | 8/1998 |
| WO | 2006085185 A1 | 8/2006 |
| WO | 2013125821 A1 | 8/2013 |
| WO | 2014159372 A1 | 10/2014 |

OTHER PUBLICATIONS

HILTI MI/MZ Technical Guide, 4.2 MQ System Components—Load Data and Material Specifications, MQM Wing Nut, (at least as early as Mar. 13, 2012), 1 page, www.us.hilti.com, Canada.

B-Line by EATON—Channel Nuts & Hardware, Strut Systems, (at least as early as Mar. 13, 2012), pp. 45-53.

Power-Strut Engineering Catalog, Pictorial Table of Contents, (at least as early as Mar. 13, 2012), pp. 11-14, www.alliedeg.com.

Unistrut, Channels Nuts, Top Retainer Nut, (at least as early as Mar. 13, 2012), 1 page.

Unistrut, P1000® & P1001 Channels, (at least as early as Mar. 13, 2012), 1 page.

Unistrut, P1100® & P1101 Channels, (at least as early as Mar. 13, 2012), 1 page.

Unistrut, P2000® & P2001 Channels, (at least as early as Mar. 13, 2012), 1 page.

Unistrut General Engineering Catalog, Unistrut Corporation, Mar. 1, 1998; pp. 117, 118.

POWER-STRUT® Engineering Catalog, Tyco International, 2008, pp. 63, 65.

A guide to threadlocking adhesives, Reliable Plant, May 28, 2013, (online), retrieved on Apr. 27, 2017, retrieved from the internet, https://web.archive.org/web/20130528020650/http:www.reliableplant.com/Read/27159/Guide-to-threadlocking-adhesives.

"Dovetail" Google.com, retrieved online on Sep. 18, 2017 from URL:https://www.google.com/search?q+define%A+dovetail.

CONDUIT CLAMP FOR STRUT CHANNEL

CROSS-REFERENCE TO RELATED APPLICATIONS

This application is a continuation of U.S. application Ser. No. 14/702,145, filed on May 1, 2015, now issued as U.S. Pat. No. 9,546,744, which claims priority to Indian Patent Application No. 1197/DEL/2014 filed on May 2, 2014, the entirety of each of which is incorporated herein by reference.

FIELD OF THE DISCLOSURE

The present disclosure generally relates to a conduit clamp for use with strut channel.

BACKGROUND

Strut channel, also referred to as simply "strut," is used in the construction and electrical industries for structural support, often for supporting wiring, plumbing, or mechanical components such as air conditioning or ventilation systems. Strut is usually formed from metal sheet, folded over into an open channel shape with inturned lips to provide additional stiffness and as a location to mount fittings for securing one or more components to the strut. One such component typically secured to strut is a conduit (e.g., a pipe for liquid or gas or a conduit for wires). The conduit may be secured to the strut with a conduit clamp that engages the inturned lips of the open channel.

A new design of channel framing suitable for use as strut is disclosed in co-pending U.S. application Ser. No. 13/966,897 filed Aug. 14, 2013. The strut disclosed in the '897 application includes the open channel and the inturned lips for mounting conventional fitting(s) thereto and also offers additional sides that are functional for mounting additional fitting(s) to secure one or more components to other sides of the strut.

SUMMARY

In one aspect, a conduit clamp for mounting a conduit on strut channel includes a first coupling component configured for attachment to a first attachment structure of a strut channel. A second coupling component is different from the first coupling component and configured for attachment to a second attachment structure of a strut channel. A conduit engaging portion is interposed between and interconnects the first and second coupling components. The conduit engaging portion is configured to engage a conduit for mounting the conduit on strut channel.

In another aspect, a conduit clamp for mounting a conduit on strut channel includes first and second opposing jaws secured to one another. Each of the opposing jaws includes a first coupling component designed and constructed to lock in a continuous slot of a strut channel and a second coupling component designed and constructed to lock in a groove of a strut channel.

In yet another aspect, a method of mounting a conduit includes providing strut having a first attachment structure and a second attachment structure different from the first attachment structure. A conduit clamp including a first coupling component configured for attachment to the first attachment structure and a second coupling component configured for attachment to the second attachment structure is provided. One of the first and second coupling components is selected for attachment to the strut. The selected coupling component is attached to the corresponding attachment structure.

BRIEF DESCRIPTION OF THE DRAWINGS

Corresponding reference characters indicate corresponding parts throughout the drawings.

DETAILED DESCRIPTION

Figure 1:
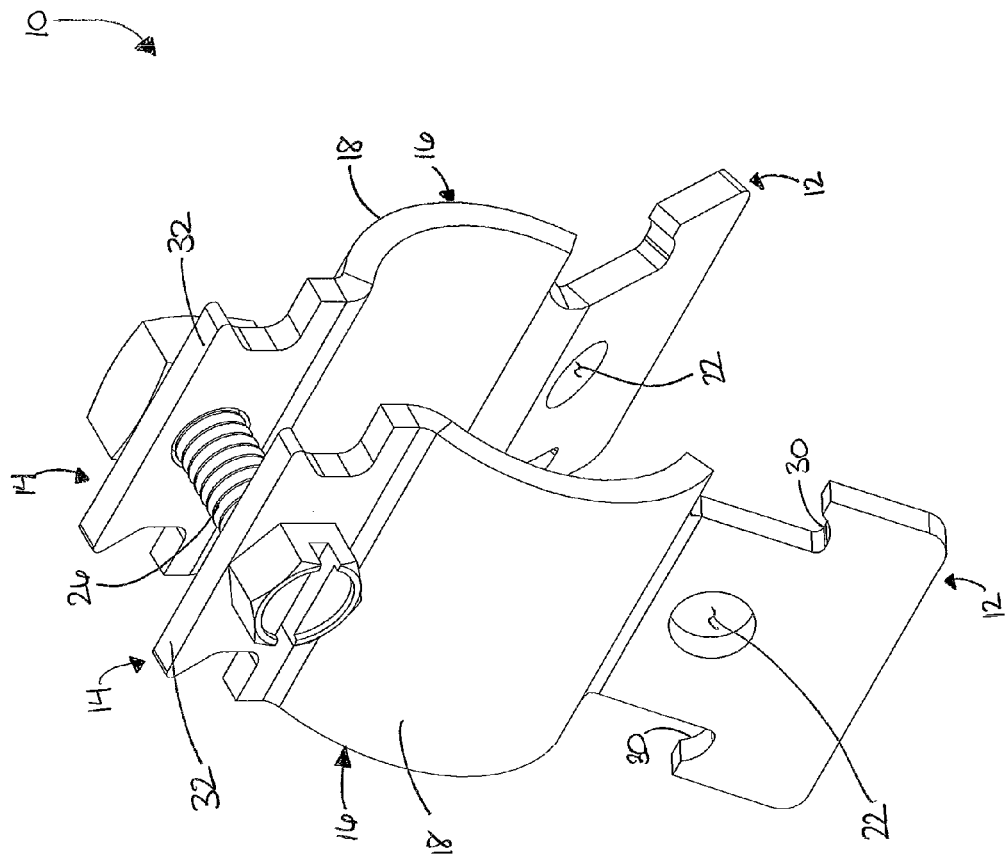
FIG. 1 is a perspective of a conduit clamp for use in mounting a conduit to strut, illustrating the conduit clamp in a first orientation.
Figure 2:
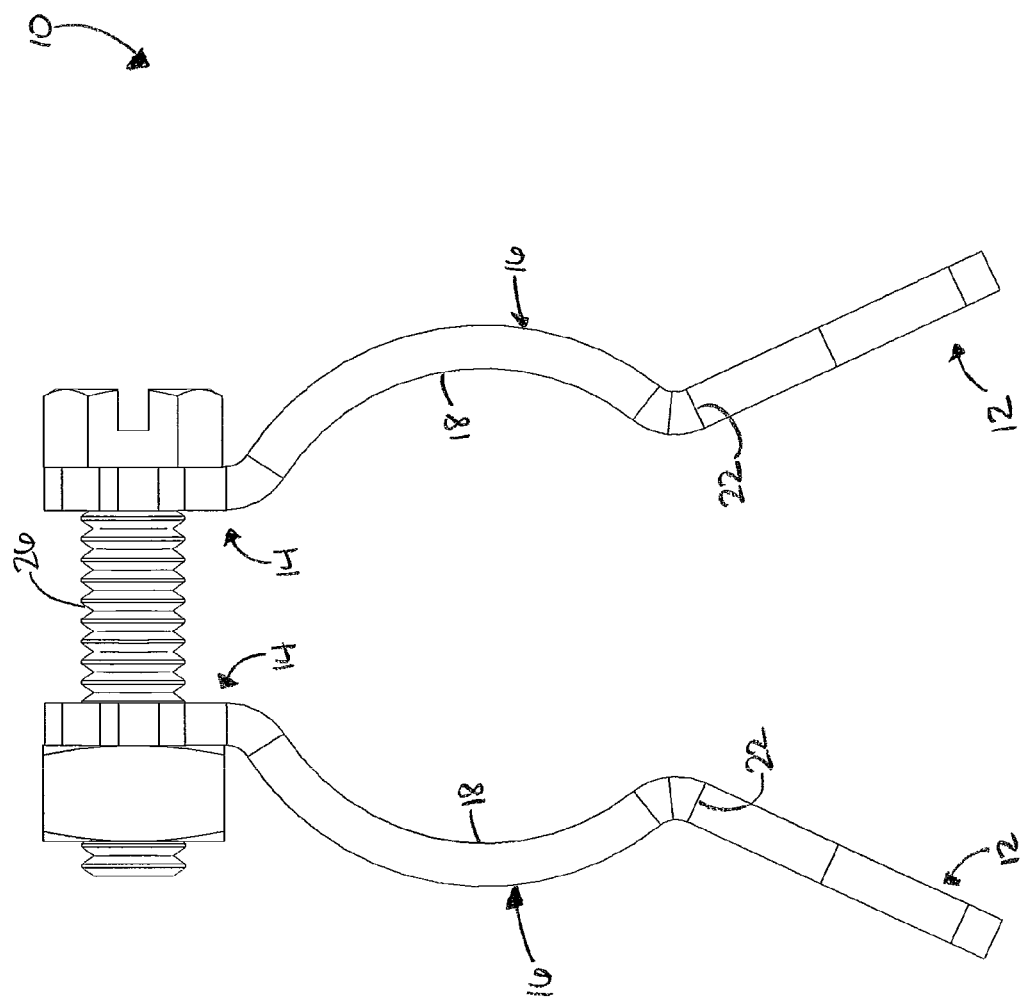
FIG. 2 is a front elevation of FIG. 1.
Figure 3:
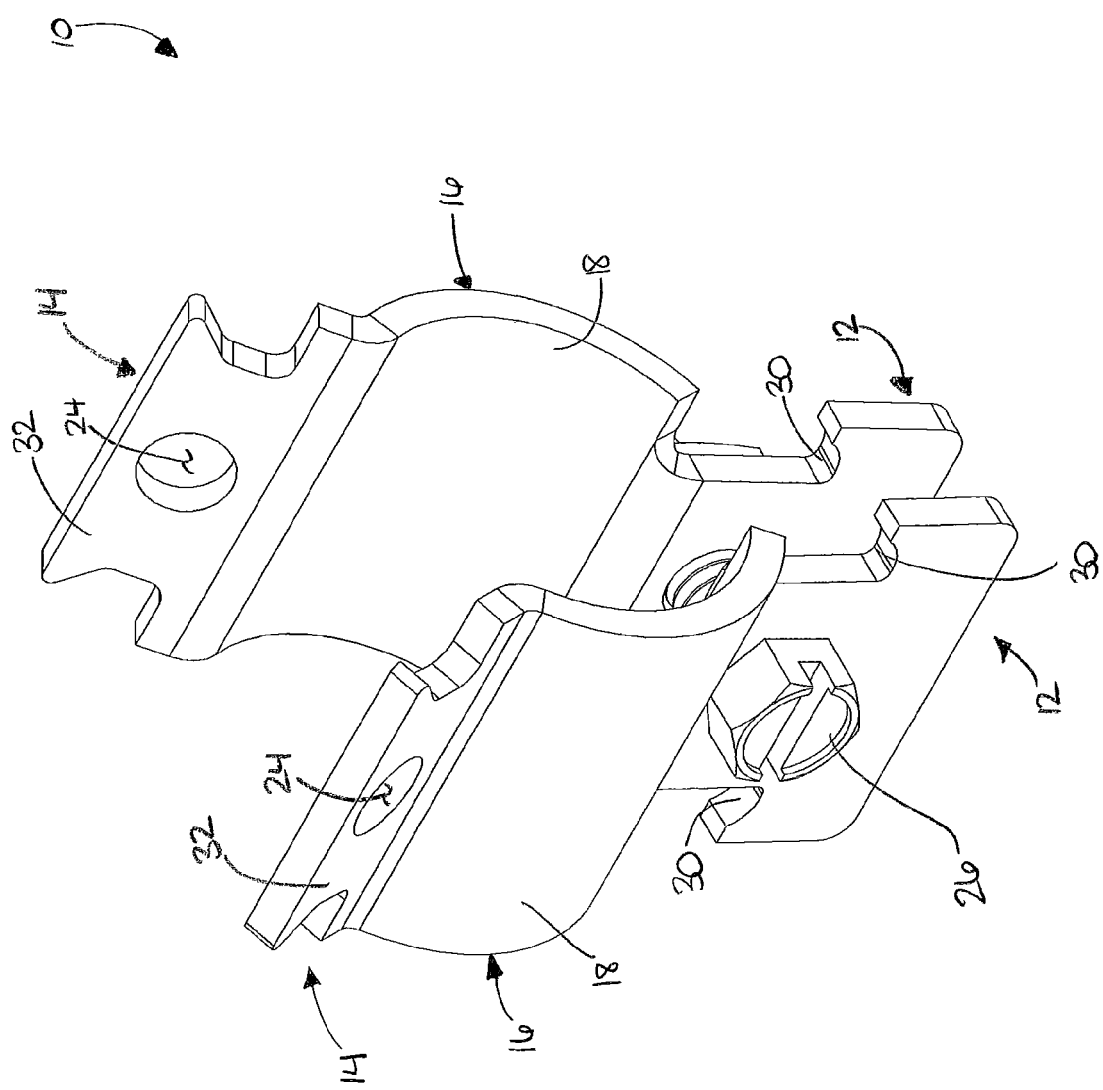
FIG. 3 is a perspective of the conduit clamp, illustrating the conduit clamp in a second orientation.
Figure 4:
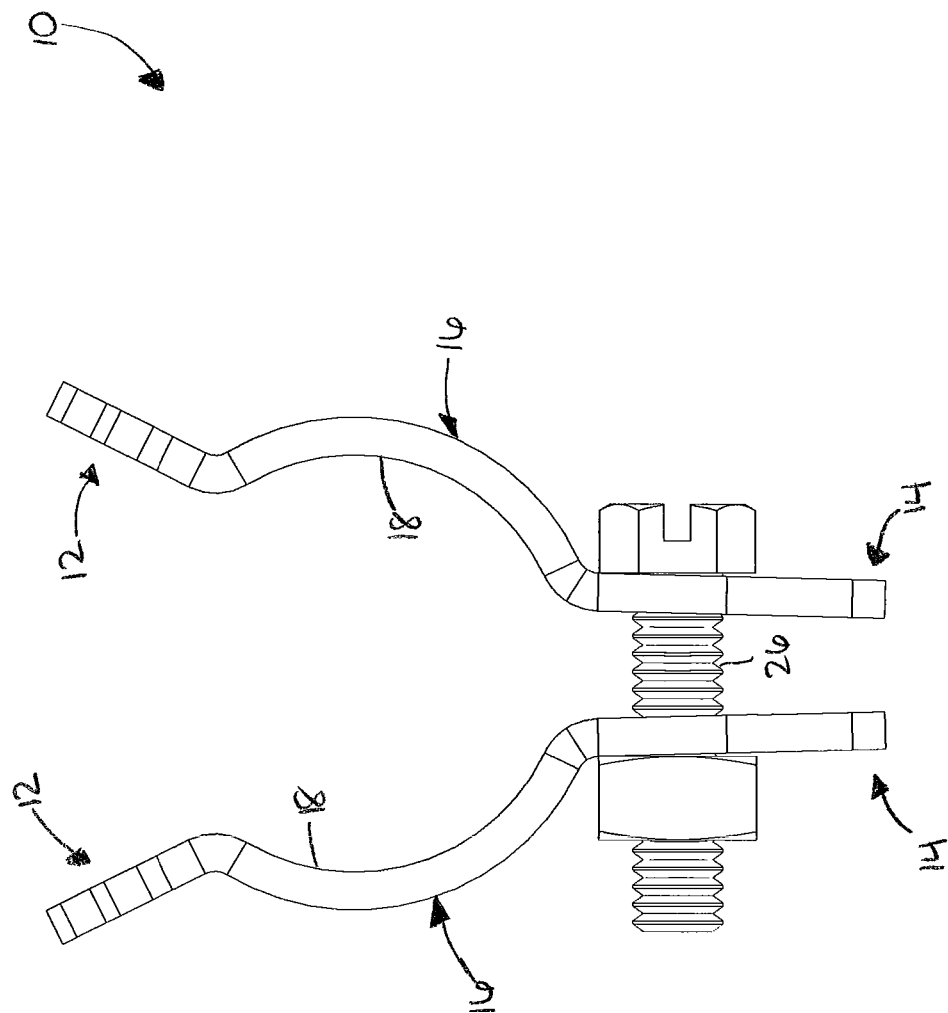
FIG. 4 is a front elevation of FIG. 3.
Figure 5:
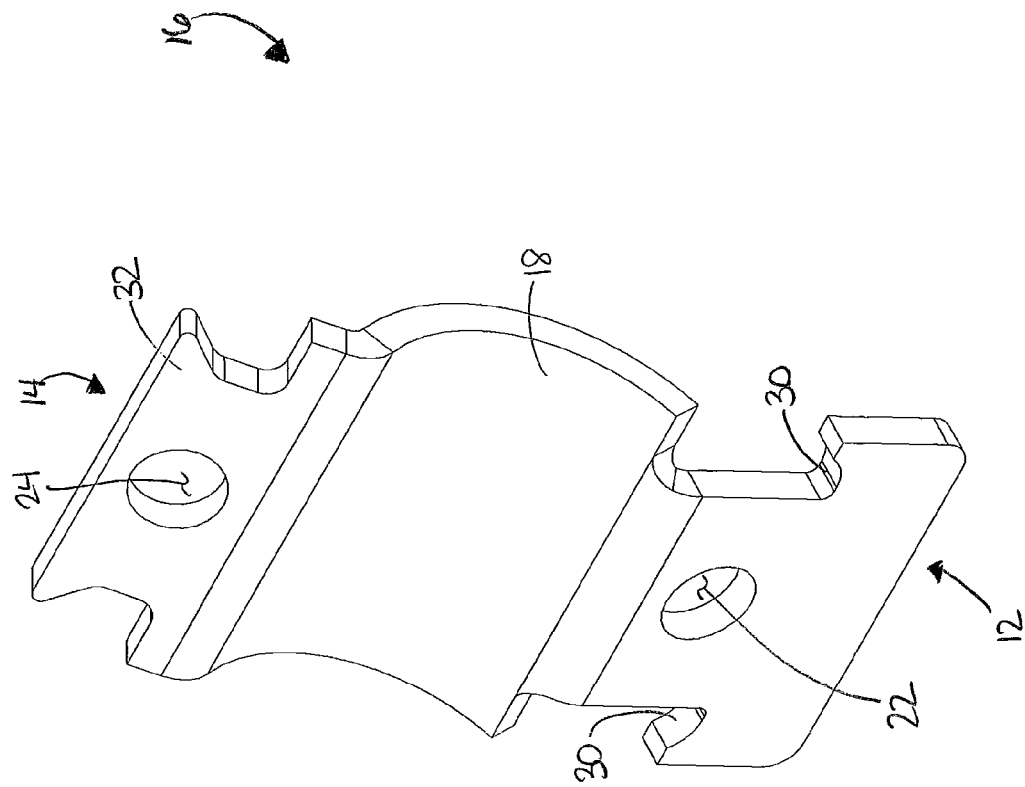
FIG. 5 is a perspective of a jaw of the conduit clamp.
Figure 6:
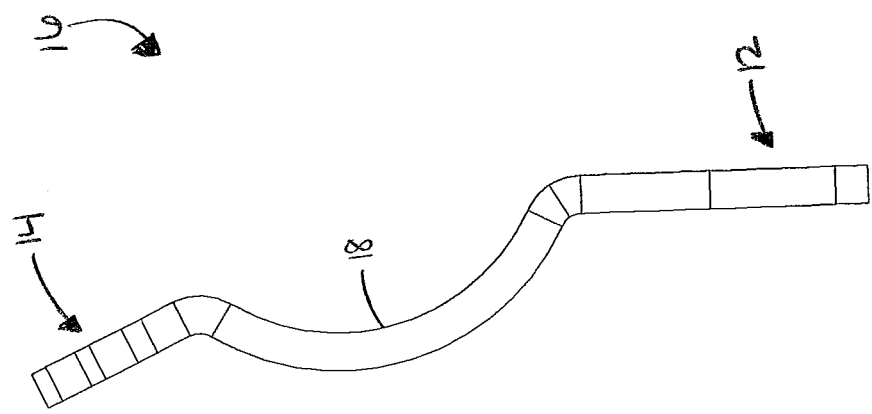
FIG. 6 is a right side elevation of FIG. 5.
Figure 7:
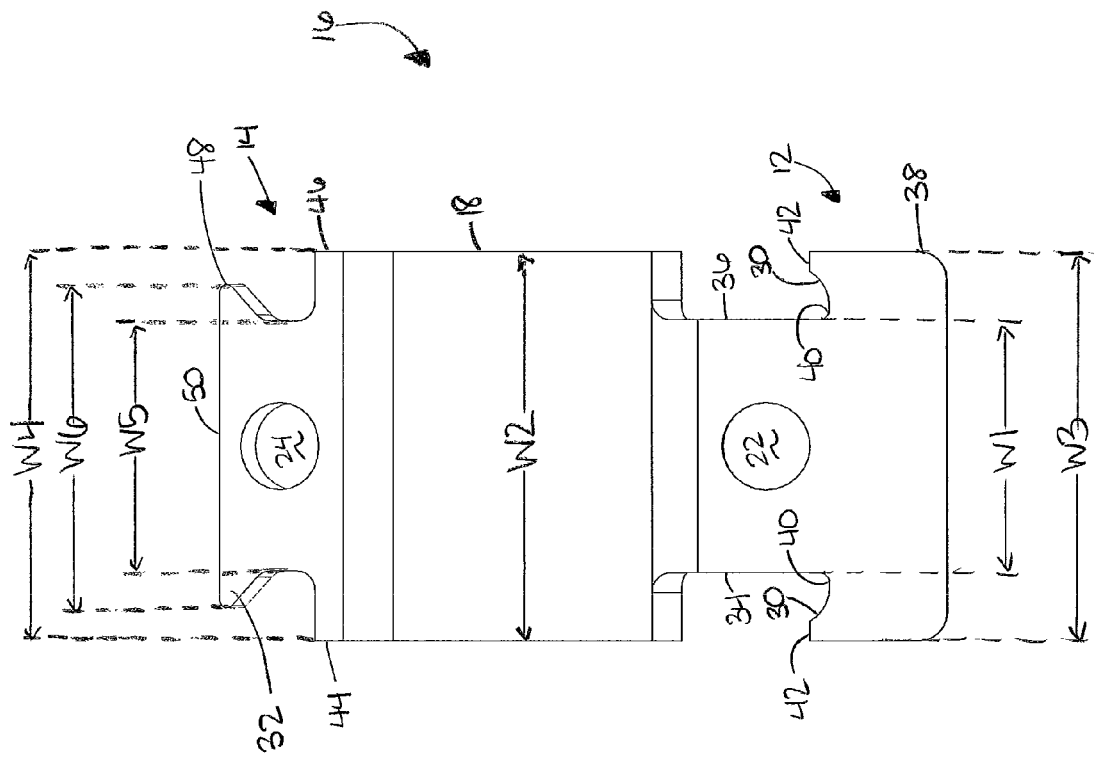
FIG. 7 is a front elevation of FIG. 5.
Figure 8:
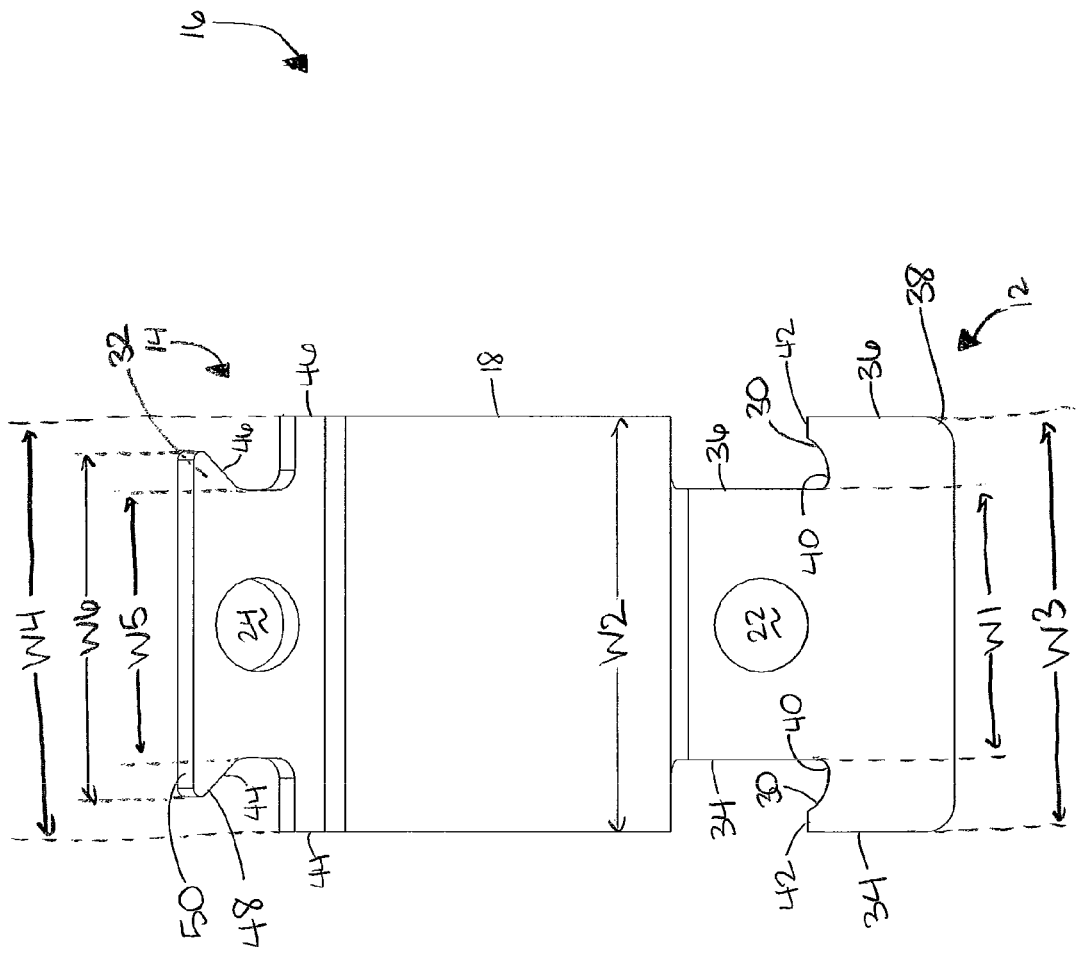
FIG. 8 is a rear elevation of FIG. 5.

Referring to FIGS. 1-4, a conduit clamp for mounting a conduit (e.g., a pipe) to strut channel (also referred to in the below disclosure as simply "strut") is generally indicated at 10. The conduit clamp (or pipe clamp) 10 is configured for use with multiple strut configurations. Specifically, the conduit clamp 10 includes coupling components 12, 14 (indicated generally) for use with struts having different fitting attachment structures, as described in detail below.

The conduit clamp 10 includes a pair of opposing jaws, generally indicated at 16. As seen in FIGS. 1-8, each jaw 16 includes a first coupling component 12, a second coupling component 14, and a conduit engaging portion 18 interposed between the first and second coupling components. As illustrated, the conduit engaging portion 18 is arcuate to generally conform to a circumferential portion of a conduit C received and secured between the opposing jaws 16. Each of the coupling components 12, 14 extend at an offset angle from the conduit engaging portion 18. In the illustrated embodiment, each of the opposing jaws 16 is formed as a unitary structure. The jaws 16 may be formed from rigid metal, such as low carbon steel, stainless steel, aluminum, or other metals, or from other material.

The first and second coupling components 12, 14 include first and second sets of openings 22, 24, respectively, configured to receive a fastener 26 (e.g., a bolt) therethrough. In one embodiment, the first set of openings 22 in the first coupling components 12 receives the fastener 26 to secure the opposing jaws 16 to one another for clamping a conduit C between the opposing jaws (see, e.g., FIGS. 3 and 4). In another embodiment, the set of openings 24 in the second coupling components 14 receives the fastener 26 to secure the opposing jaws 16 to one another for clamping a conduit C between the opposing jaws (see, e.g., FIGS. 1 and 2). The sets of openings 22, 24 permit the clamp 10 to be attached to strut using either of the coupling components 12, 14. As seen in FIGS. 1-4, when one set of openings 22, 24 receives the fastener 26, the opposite coupling components 12, 14 generally move away from one another.

The first coupling component 12 is configured for attachment to strut having a first attachment structure, and the second coupling component 14 is configured for attachment to strut having a second attachment structure different from the first attachment structure. In the illustrated embodiment, the first coupling component 12 includes J-hook fittings 30, and the second coupling component 14 includes a generally dovetail shaped fitting 32. It is understood that the first and second coupling components 12, 14 can have different configurations within the scope of the present invention. Because the conduit clamp 10 includes two different coupling components 12, 14, the clamp can be used with strut including different attachment structures. The clamp 10 can be attached to strut in the appropriate orientation depending on the attachment structure of the strut and which end of the clamp is used to engage the strut attachment structure.

Referring still to FIGS. 1-8, the first coupling component 12 includes sides 34, 36 extending along the first coupling component from the conduit engaging portion 18 to a free end 38 of the coupling component. The sides 34, 36 are generally parallel to each other at a portion adjacent the conduit engaging portion 18 and at the free end 38. A width W1 of the first coupling component 12 at the conduit engaging portion 18 is less than a width W2 of the conduit engaging portion and less than a width W3 of the first coupling component at the free end 38. Each of the sides 34, 36 defines a fitting (e.g., J-hook fitting 30) for engaging attachment structure of strut. As illustrated, each of the sides 34, 36 extend outward from each other to define the J-hook 30 including an engagement notch 40 and a shoulder 42 configured for attachment to strut, as described below.

The second coupling component 14 includes sides 44, 46 extending along the second coupling component from the conduit engaging portion 18 to a free end 48 of the coupling component. The sides 46, 48 are generally parallel to each other at a portion adjacent the conduit engaging portion 18 and at a center portion between the conduit engaging portion and the free end 48. The second coupling component 14 has a first width W4 substantially equal to the width W2 of the conduit engaging portion 18, a second width W5 less than the first width, and a third width W6 less than the first width and greater than the second width. The sides 44, 46 flare away from each other as they extend from the center portion to the free end 48 of the second coupling component 14 so that the second coupling component has a generally dovetail cross-sectional shape, defining the dovetail fitting 32. A bottom edge 50 extends between and connects the sides 44, 46.

Figure 9:
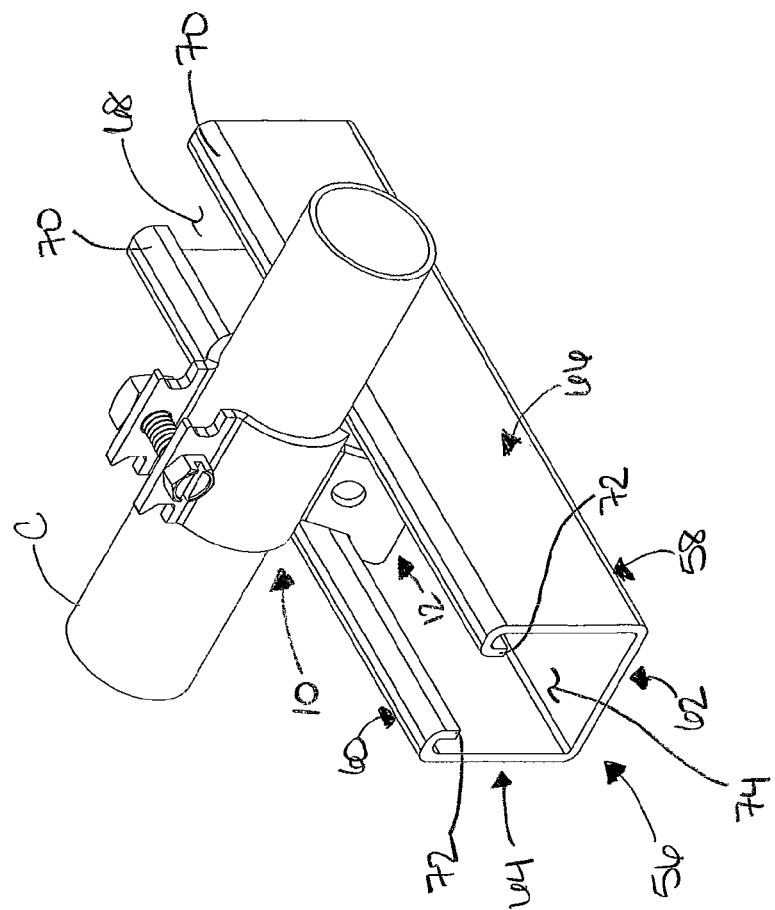
FIG. 9 is a perspective of the conduit clamp secured to a first embodiment of conventional strut.
Figure 10:
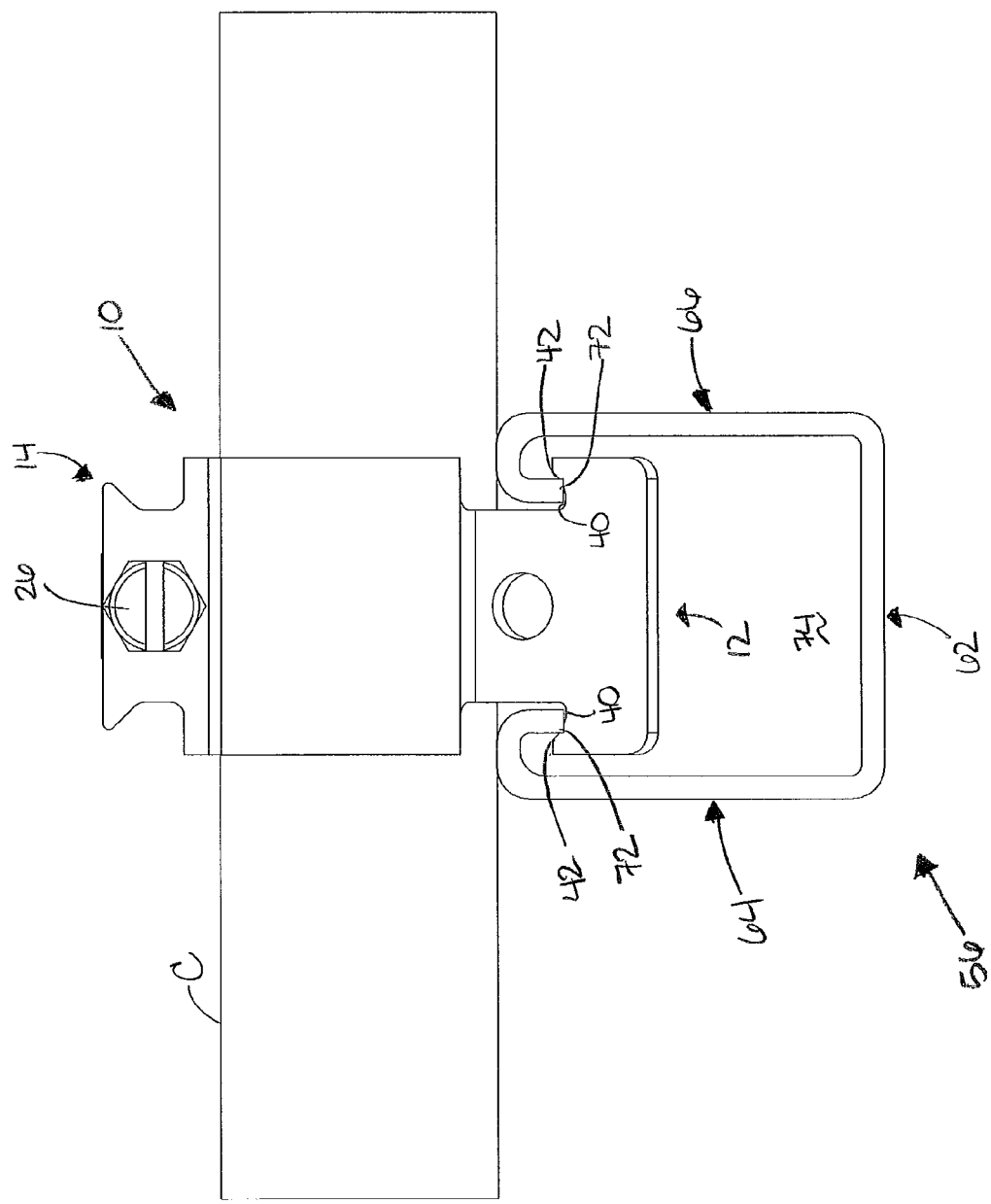
FIG. 10 is a front elevation of FIG. 9.
Figure 11:
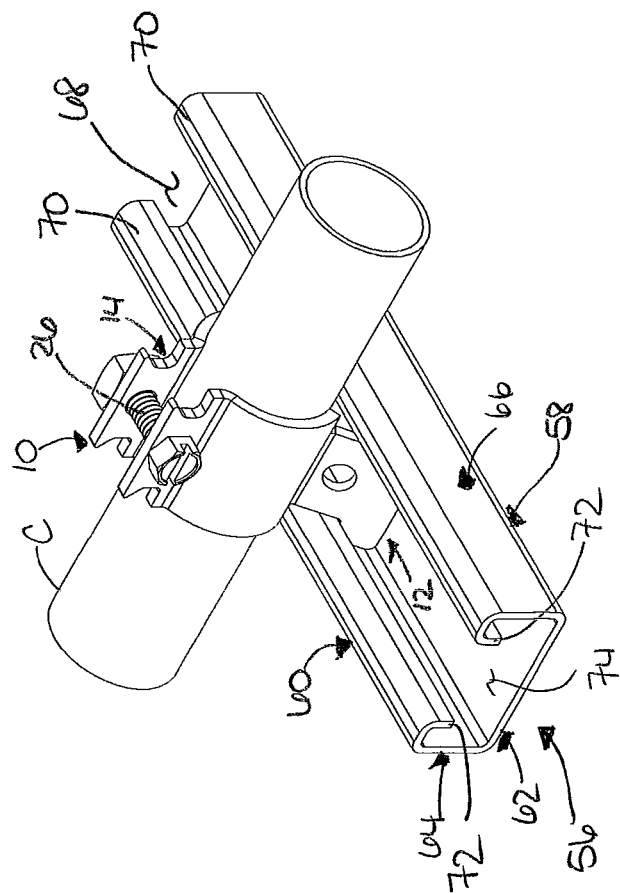
FIG. 11 is a perspective of the conduit clamp secured to a second embodiment of conventional strut.
Figure 12:
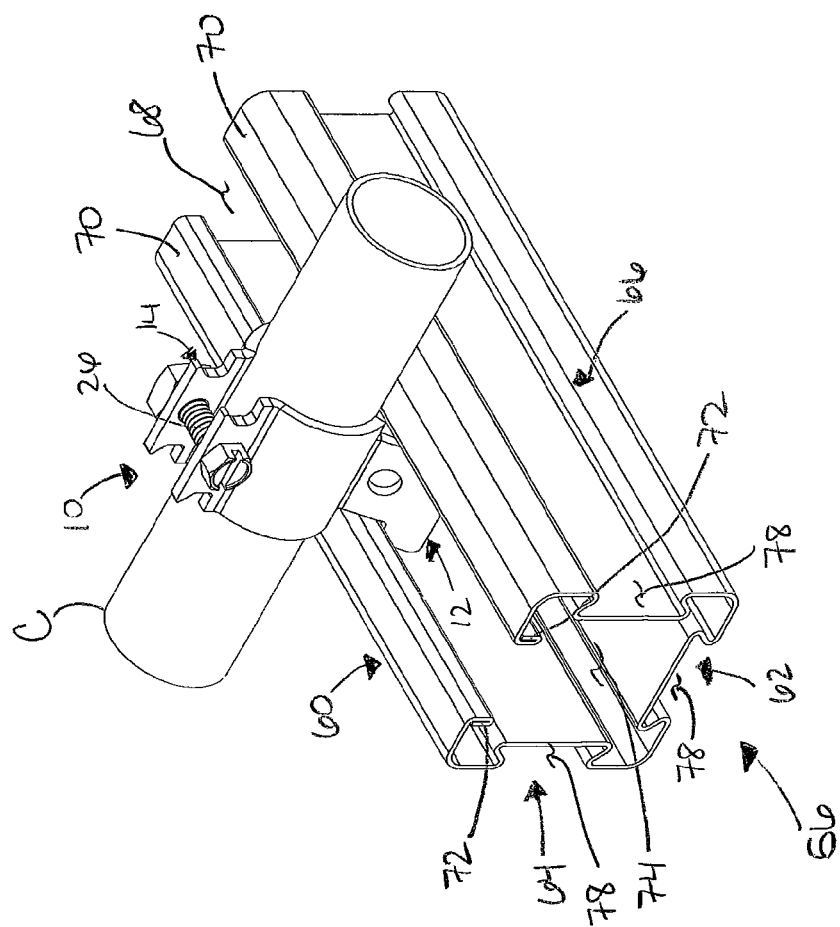
FIG. 12 is a perspective of the conduit clamp secured to a first embodiment of new strut, the conduit clamp secured within a continuous slot defined by a first side of the new strut.
Figure 13:
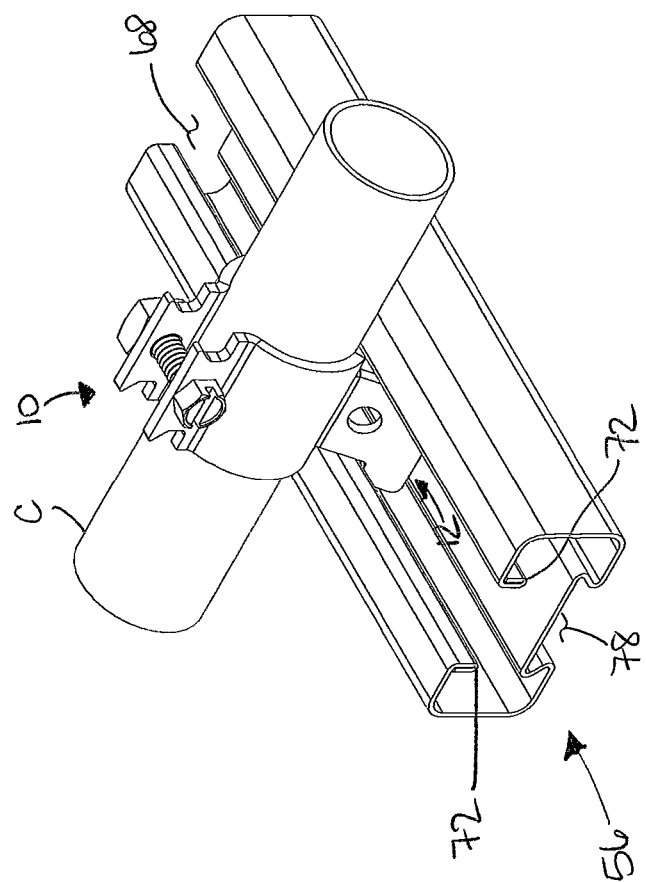
FIG. 13 is a perspective of the conduit clamp secured to a second embodiment of new strut, the conduit clamp secured within a continuous slot defined by a first side of the new strut.

The conduit clamp 10 is configured for attachment to multiple types of strut 56. In general, referring to FIGS. 9-18, the strut 56 has an elongate body 58 with a generally square or rectangular cross-sectional shape having an upper side 60, a lower side 62, a right side 64, and a left side 66 (each indicated generally). The upper side 60 defines a continuous slot 68 (i.e., the upper side is open). The upper side 60 has outside surfaces 70 on either side of the slot 68, and inwardly (or downwardly) depending lips 72 leading to an open interior 74 of the strut 56. In some embodiments, the lips 72 are the only attachment structure of the strut 56 (see, e.g., FIGS. 9-11) for the pipe clamp 10. In other embodiments, the strut 56 can include one or more fitting grooves 78 extending lengthwise of the body 58 (see, e.g., FIGS. 12-18) for the pipe clamp 10. For example, the strut can be strut as described in co-pending U.S. application Ser. No. 13/966,897 filed Aug. 14, 2013, the entirety of which is hereby incorporated by reference. Each of the lower, right, and left sides 62, 64, 66, respectively, can define a fitting groove 78 (see, e.g., FIGS. 12 and 18). Alternatively, at least the side (e.g., lower side 62) opposite the slotted side (e.g., upper side 60) defines a fitting groove 78, while the other two sides (e.g., the right and left sides 64, 66) may or may not define fitting grooves (see, e.g., FIGS. 13-17).

Figure 15:
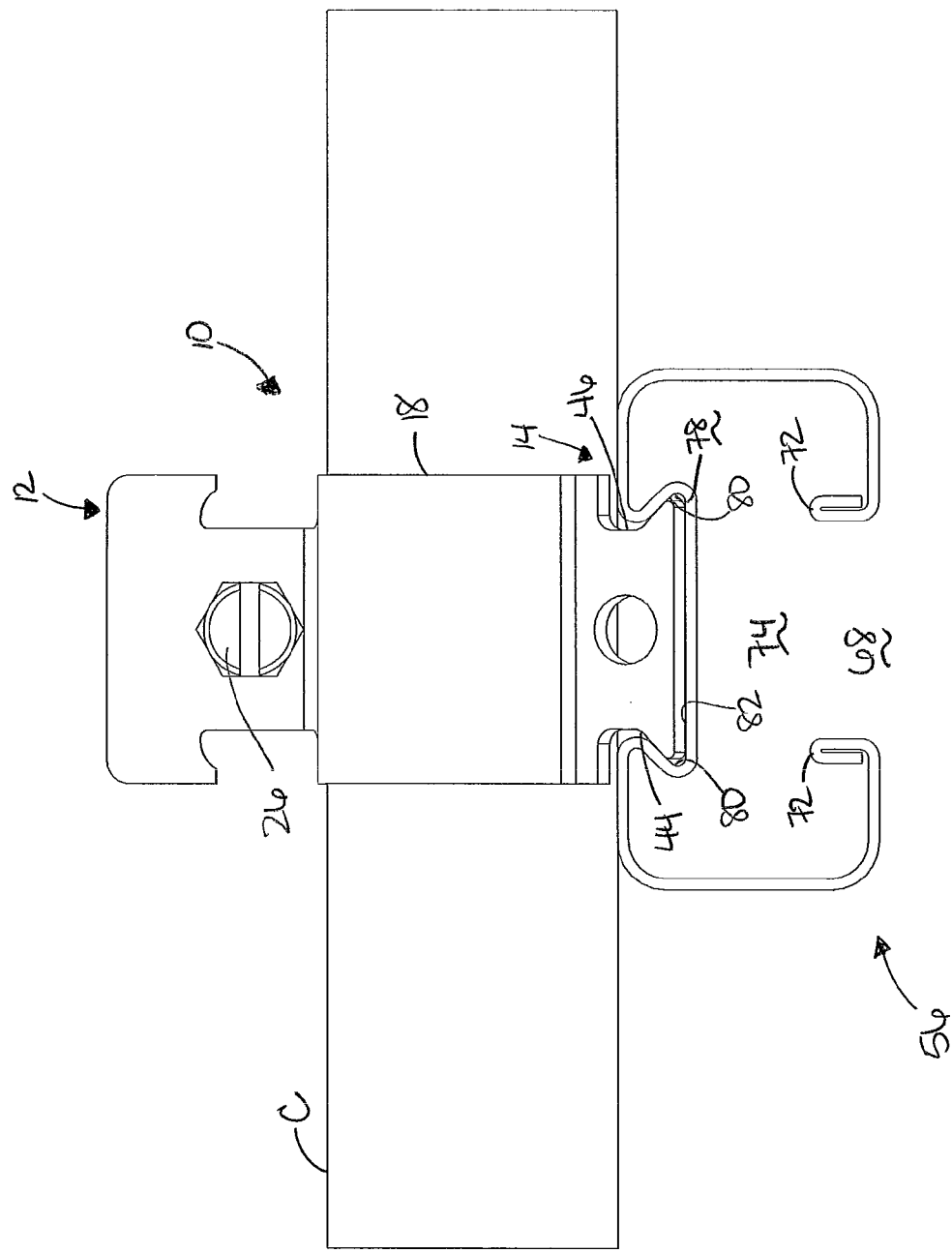
FIG. 15 is a front elevation of FIG. 14.

Each fitting groove 78 is defined by opposing side walls 80 extending inwardly from generally planar outer surfaces of the corresponding side 62, 64, 66 and toward the interior 74 of the body 58 (FIG. 15). The side walls 80 extend to a bottom wall 82 that spans between and interconnects the side walls. The side walls 80 flare away from one another as they extend inward from the outer surfaces toward the bottom 82 of the fitting groove 78 so that each fitting groove has a generally dovetail cross-sectional shape. Accordingly, each fitting groove 78 has a first relatively narrower width (e.g., a minimum width) at its entrance and a second relatively wider width (e.g., a maximum width) adjacent the bottom wall 82. In general, the fitting grooves 78 are configured for receiving a coupling component of a fitting for use in attaching or securing the fitting to any one of the sides 62, 64, 66 of the strut channel 56, such as the second coupling components 14 of the conduit clamp 10. As explained in more detail below, the coupling component is configured to generally "lock" (such as twist lock) in the fitting groove to inhibit withdrawal of the fitting from the groove.

Referring to FIGS. 9-13, in one embodiment, the conduit clamp 10 is attached to strut 56 by the first coupling component 12. To attach the conduit clamp 10 to the strut 56, the first coupling components 12 of the jaws 16 may be slid through an open end of the strut. Alternatively, the first coupling components 12 of the jaws 16 may be inserted or dropped into the slot 68 and then the conduit clamp 10 can be rotated to orient the first coupling components generally perpendicular to the slot. For example, the second coupling components 14 may be pressed together, and the first coupling components 12 inserted into the slot 68 so that the first coupling components are oriented to generally align with the slot. Alternatively, the opposing jaws 16 can be separately inserted into the slot 68 (e.g., insert each first coupling component 12 to generally align with the slot as described, but without pressing the second coupling components 14 of the jaws together). After inserting the first coupling components 12 into the slot 68 in this orientation, the conduit clamp 10 is rotated (e.g., about 90 degrees or more generally about a quarter turn), whereupon the first coupling components 12 rotate into an orientation in which they are generally perpendicular to the slot 68 to lock the first coupling components and the conduit clamp in the slot. When the first coupling components 12 are locked into place in the slot 68, J-hooks 30 engage the lips 72 of the upper side 60 of the strut 56. Specifically, the notches 40 receive the lips 72 and the shoulders 42 extend upward to retain the lips in the notches (see FIG. 10). The conduit C can then be inserted between the jaws 16, specifically between the conduit engaging portions 18, and the fastener 26 inserted into the set of openings 24 in the second coupling components 14 and tightened to secure the conduit to the strut 56. Alternatively, the conduit C can be laid on the strut 56 between the opposing jaws 16, and the opposing jaws then brought together and connected by the fastener 26. Or, the conduit C can be laid on the strut 56 first, and the opposing jaws 16 inserted into the slot 68 on either side of the conduit and rotated as described. The jaws 16 are tightened around the conduit C by tightening the fastener 26 (e.g., tightening a bolt and nut). Once the conduit C is secured by the conduit clamp 10, the conduit limits rotation of the conduit clamp and holds the conduit clamp in the locking orientation.

Figure 14:
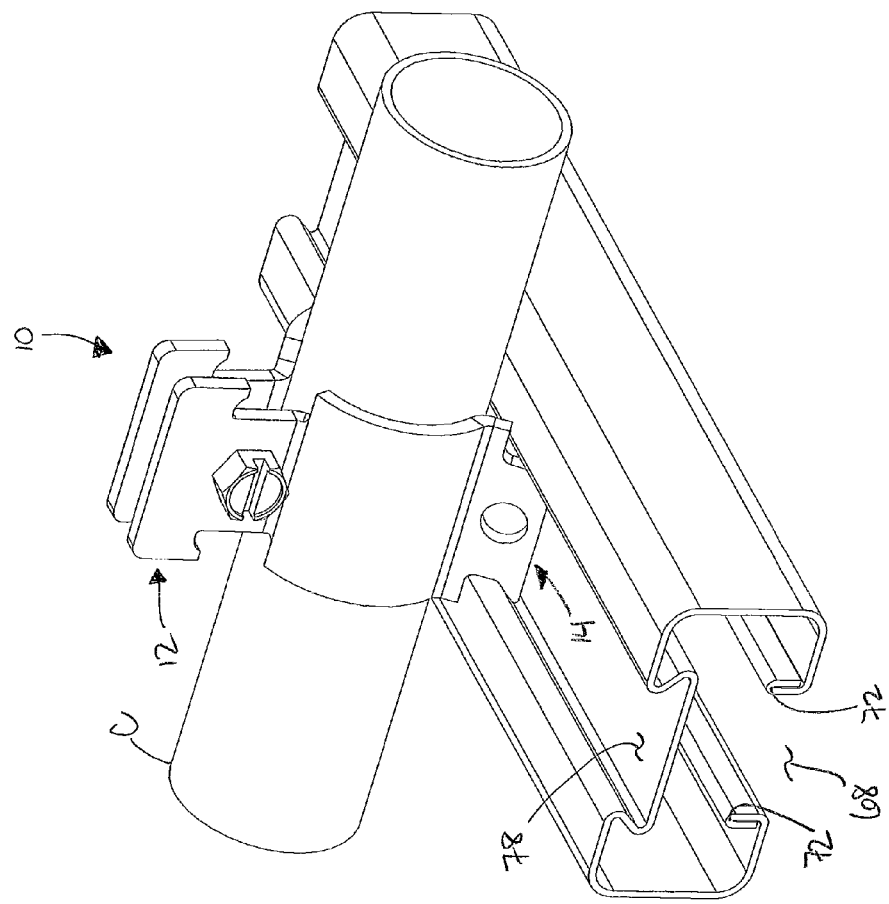
FIG. 14 is a perspective of the conduit clamp secured to the second embodiment of new strut, the conduit clamp secured within a fitting groove defined by a second side of the new strut.

Referring to FIGS. 14 and 15, in one embodiment, the conduit clamp 10 is attached to strut 56 by the second coupling component 14. To attach the conduit clamp 10 to the strut 56, the second coupling components 14 of the jaws 16 may be slid through an open end of one of the fitting grooves 78. Alternatively, the second coupling components 14 of the jaws 16 may be inserted or dropped into the fitting groove 78 and then the conduit clamp 10 can be rotated to orient the second coupling components generally perpendicular to the fitting groove. For example, the first coupling components 12 may be pressed together, and the second coupling components 14 inserted into the fitting groove 78 so that the second coupling components are oriented to generally align with the fitting groove. Alternatively, the opposing jaws 16 can be separately inserted into the fitting groove 78 (e.g., insert each second coupling component 14 to generally align with the fitting groove as described, but without pressing the first coupling components 12 of the jaws together). After inserting the second coupling components 14 into the fitting groove 78 in this orientation, the conduit clamp 10 is rotated (e.g., about 90 degrees or more generally about a quarter turn), whereupon the second coupling components rotate into an orientation in which they are generally perpendicular to the fitting groove to lock the second coupling components and the conduit clamp in the fitting groove. When the second coupling components 14 are locked into place in the fitting groove 78, the dovetail fitting 32 of the second coupling component is aligned with and engages the dovetail fitting groove. Specifically, the sides 44, 46 and bottom 50 of the second coupling components 14 engage the side walls 80 and bottom wall 82, respectively, of the fitting groove 78 (FIG. 15). The conduit C can then be inserted between the jaws 16, specifically between the conduit engaging portions 18, and the fastener 26 inserted into the set of openings 22 in the first coupling components 12 and tightened to secure the conduit to the strut. Alternatively, the conduit C can be laid on the strut 56 between the opposing jaws 16, and the opposing jaws then brought together and connected by the fastener 26. Or, the conduit C can be laid on the strut 56 first, and the opposing jaws 16 inserted into the fitting groove 78 on either side of the conduit and rotated as described. The jaws 16 are tightened around the conduit C by tightening the fastener 26 (e.g., tightening a bolt and nut). Once the conduit C is secured by the conduit clamp 10, the conduit limits rotation of the conduit clamp and holds the conduit clamp in the locking orientation.

Thus, as described above, the conduit clamp 10 is configured for engagement with strut including the typical slot 68 and lips 72, and with strut including fitting groove(s) 78 (or, with strut including both the slot and the fitting groove). The conduit clamp 10 can be attached to the strut in any desired orientation, depending on the configuration of the strut and the desired orientation of the conduit. The conduit clamp 10 is a universal clamp that can be attached to typical strut or to strut including fitting grooves that permit attachment on multiple sides of the strut.

Figure 16:
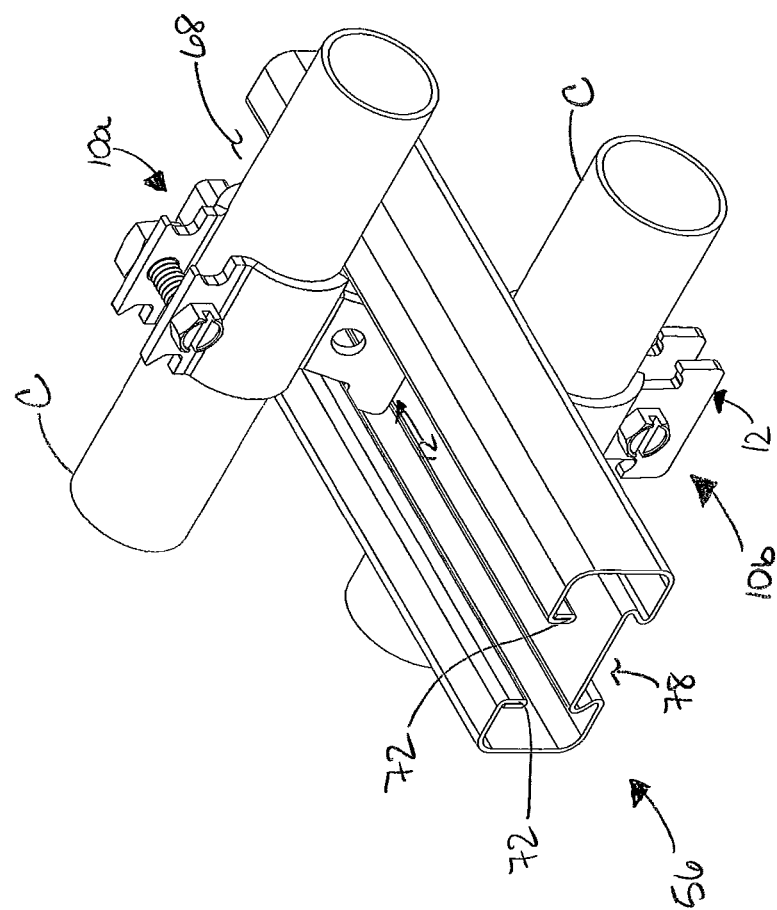
FIG. 16 is a perspective showing multiple conduit clamps secured to the second embodiment of new strut.
Figure 17:
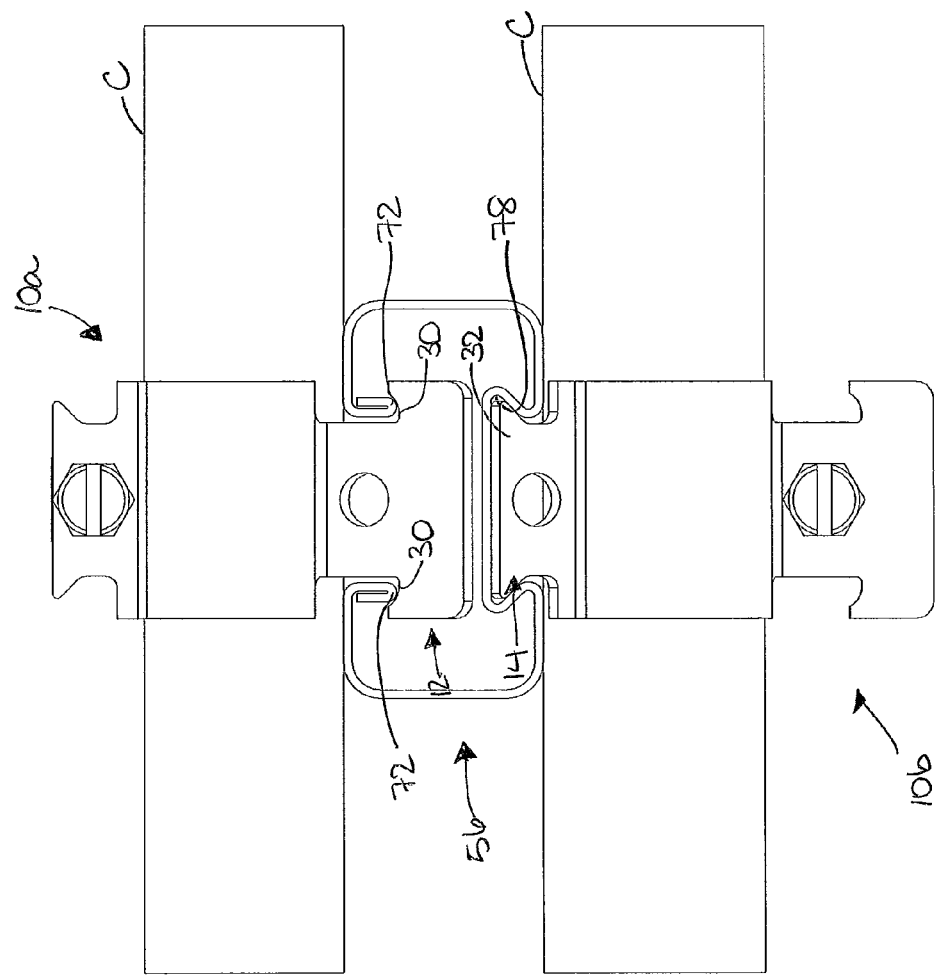
FIG. 17 is a front elevation of FIG. 16.
Figure 18:
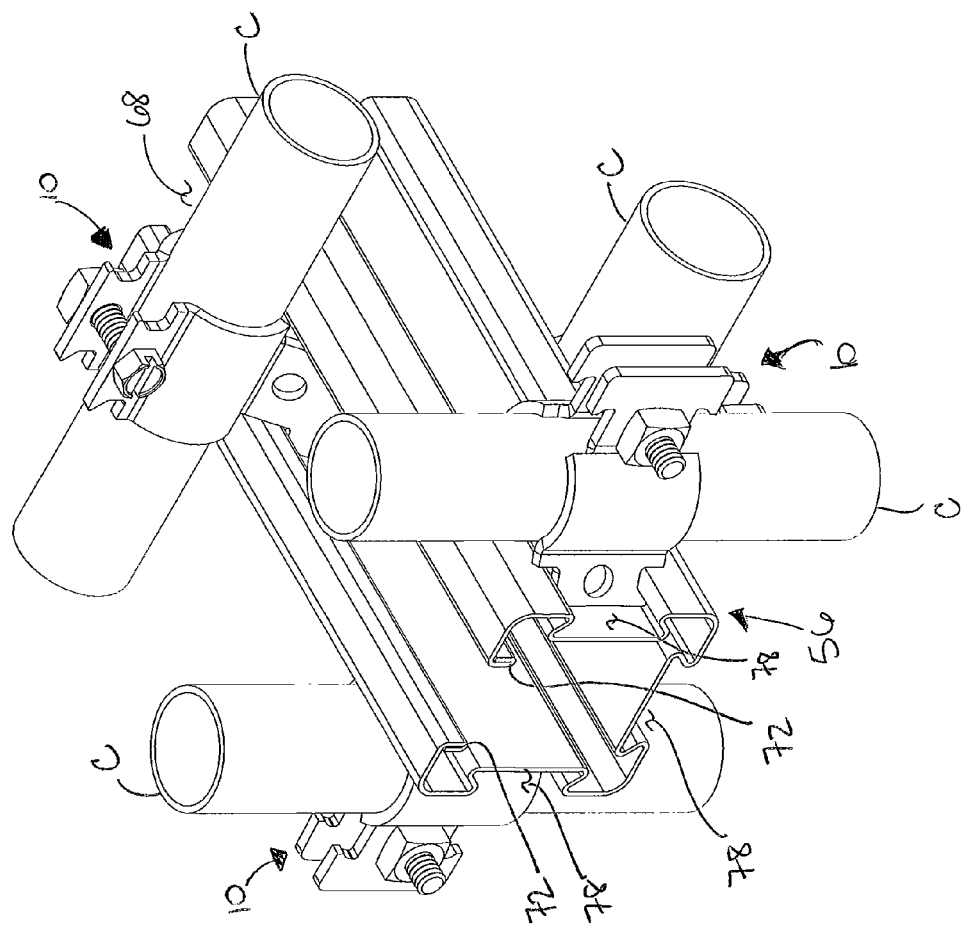
FIG. 18 is a perspective showing multiple conduit clamps secured to the first embodiment of new strut.

As seen in FIGS. 16-18, multiple conduit clamps 10 can be attached to the strut 56 to mount multiple conduits C to the strut. As illustrated in FIGS. 16 and 17, a first conduit clamp 10a is attached to the strut with the first coupling components 12 and a second conduit clamp 10b is attached to the strut with the second coupling components 14. As seen in FIG. 18, conduit clamps can be attached to every side of the strut 56 if the strut includes attachment structure on every side.

In one embodiment, a system for mounting a conduit can be sold and shipped to a customer. The system includes strut 56 (such as any of the strut types shown and described above) and at least one conduit clamp 10. In one embodiment, the system includes multiple conduit clamps 10. The system can further include the fastener 26 for attaching the opposing jaws 16 of the conduit clamp, or one fastener 26 for each conduit clamp in the system.

A method of mounting a conduit comprises providing strut having a first attachment structure and a second attachment structure different from the first (e.g., the lips 72 and the fitting groove 78). A conduit clamp 10 having a first coupling component configured for attachment to the first attachment structure and a second coupling component configured for attachment to the second attachment structure is provided. Depending on the needs of the job site, the orientation of the conduit, and the orientation of the strut, one of the first and second coupling components of the conduit clamp 10 is selected for attachment to the strut. After the selected coupling component is attached to the respective attachment structure, the conduit is inserted into the conduit clamp and the opposing jaws are secured together with a fastener.

The conduit clamp 10 is suitable for attachment to known strut configurations, such as, for example the following channel product numbers sold by Cooper B-Line: B22 (see, e.g., FIG. 9), B54 (see, e.g., FIG. 11), Z22 (see, e.g., FIG. 12), Z52 (see, e.g., FIG. 13), and any other known strut. The conduit clamp 10 is also suitable for attachment to strut having a different attachment structure than conventional strut, such as the strut having additional functional sides as described in U.S. application Ser. No. 13/966,897. Thus, workers at the job site have the flexibility to mount conduits to the strut in any orientation, according to the needs at the job site. Furthermore, the workers need only have one type of conduit clamp, rather than requiring different clamp structures for attachment to different struts. In addition, when the conduit clamp 10 is used with the strut having additional functional sides, the length of strut required is greatly reduced. For example, instead of requiring all conduits to be positioned side-by-side in one layer on only one functional side of the strut, the conduits can be installed in two layers on two functional sides of the strut, thereby reducing the length of strut required to accommodate the conduits.

When introducing elements of the present invention or the preferred embodiments(s) thereof, the articles "a", "an", "the" and "said" are intended to mean that there are one or more of the elements. The terms "comprising", "including"

and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A conduit clamp for mounting a conduit on a strut channel having a first side defining an open channel and a second side defining a groove, the conduit clamp comprising:
  first and second jaws configured to be coupled to one another by a fastener capable of coupling the first and second jaws to one another, each of the first and second jaws comprising:
  a conduit engaging portion having opposite first and second longitudinal ends and configured to at least partially surround the conduit on the strut channel;
    a first coupling component at the first longitudinal end of the conduit engaging portion configured to attach to the strut channel within the open channel of the strut channel, the first coupling component defining a first fastener opening extending therethrough and being sized and shaped to receive the fastener, wherein the first coupling component includes a J-hook fitting; and
    a second coupling component, different from the first coupling component, at the second longitudinal end of the conduit engaging portion configured to attach to the strut channel within the groove of the strut channel, the second coupling component defining a second fastener opening extending therethrough and being sized and shaped to receive the fastener, wherein the second coupling component includes a dovetail-shaped fitting,
  wherein the J-hook fitting of each of the first and second jaws comprises first and second J-hook fittings, wherein the first and second J-hook fittings extend outward from respective opposite sides of the first longitudinal end of the corresponding conduit engaging portion, wherein the dovetail shaped fitting of each of the first and second jaws extends outward from opposite sides of the second longitudinal end of the corresponding conduit engaging portion.

2. The conduit clamp set forth in claim 1, wherein at least a portion of each conduit engaging portion has an arcuate shape.

3. The conduit clamp set forth in claim 1, wherein the first jaw is integrally formed as one-piece component, wherein the second jaw is integrally formed as a one-piece component separate from the first jaw.

4. The conduit clamp set forth in claim 1, further comprising the fastener coupling the first and second jaws to one another.

5. The conduit clamp set forth in claim 1, in combination with the strut channel.

6. A jaw for a conduit clamp for mounting a conduit on a strut channel having a first side defining an open channel and a second side defining a groove, the jaw comprising:
  a conduit engaging portion having opposite first and second longitudinal ends and configured to at least partially surround the conduit on the strut channel;
  a first coupling component at the first longitudinal end of the conduit engaging portion configured to attach to the strut channel within the open channel of the strut channel, the first coupling component defining a first fastener opening extending therethrough and being sized and shaped to receive a fastener capable of attaching the jaw to a second jaw, wherein the first coupling component includes a J-hook fitting; and
  a second coupling component, different from the first coupling component, at the second longitudinal end of the conduit engaging portion configured to attach to the strut channel within the groove of the strut channel, the second coupling component defining a second fastener opening extending therethrough and being sized and shaped to receive the fastener capable of attaching the jaw to the second jaw, wherein the second coupling component includes a dovetail-shaped fitting,
  wherein the J-hook fitting comprises first and second J-hook fittings, wherein the first and second J-hook fittings extend outward from respective opposite sides of the first longitudinal end of the conduit engaging portion, wherein the dovetail shaped fitting extends outward from opposite sides of the second longitudinal end of the conduit engaging portion.

7. The jaw for a conduit clamp set forth in claim 6, wherein at least a portion of the engaging portion has an arcuate shape.

8. The jaw for a conduit clamp set forth in claim 6, wherein the jaw is integrally formed as one-piece component.

9. The jaw for a conduit clamp set forth in claim 6, further comprising the fastener capable of coupling the jaw to the second jaw.

10. The jaw for a conduit clamp set forth in claim 6, in combination with the second jaw, wherein the second jaw is identical to the jaw.

11. The jaw for a conduit clamp set forth in claim 6, in combination with the strut channel.

* * * * *